United States Patent
Seo et al.

(10) Patent No.: US 10,193,677 B2
(45) Date of Patent: Jan. 29, 2019

(54) METHOD FOR RECEIVING DOWNLINK SIGNAL BY MEANS OF UNLICENSED BAND IN WIRELESS COMMUNICATION SYSTEM AND DEVICE FOR SAME

(71) Applicant: LG ELECTRONICS INC., Seoul (KR)

(72) Inventors: Hanbyul Seo, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/558,019

(22) PCT Filed: Mar. 31, 2016

(86) PCT No.: PCT/KR2016/003307
§ 371 (c)(1),
(2) Date: Sep. 13, 2017

(87) PCT Pub. No.: WO2016/159673
PCT Pub. Date: Oct. 6, 2016

(65) Prior Publication Data
US 2018/0062807 A1 Mar. 1, 2018

Related U.S. Application Data

(60) Provisional application No. 62/142,490, filed on Apr. 3, 2015, provisional application No. 62/238,111, filed on Oct. 6, 2015.

(51) Int. Cl.
*H04W 4/00* (2018.01)
*H04L 5/00* (2006.01)
(Continued)

(52) U.S. Cl.
CPC .............. *H04L 5/0048* (2013.01); *H04L 1/00* (2013.01); *H04L 1/0045* (2013.01); *H04L 27/26* (2013.01); *H04W 16/14* (2013.01)

(58) Field of Classification Search
CPC ...... H04W 72/04; H04W 88/08; H04W 76/00
See application file for complete search history.

(56) References Cited

U.S. PATENT DOCUMENTS

2007/0115800 A1* 5/2007 Fonseka ................ H04L 1/0054
370/208
2013/0028200 A1* 1/2013 Nory ..................... H04W 72/02
370/329

(Continued)

FOREIGN PATENT DOCUMENTS

KR 10-2011-0081985 A 7/2011
KR 10-2014-0030072 A 3/2014
(Continued)

OTHER PUBLICATIONS

NVIDIA, "Synchronization and measurements in LAA," 3GPP TSG-RAN WG1 #80, R1-150514, Athens, Greece, Feb. 9-13, 2015 (server date Feb. 8, 2015), 4 pages.

*Primary Examiner* — Siren Wei
(74) *Attorney, Agent, or Firm* — Birch, Stewart, Kolasch & Birch, LLP (57) ABSTRACT

Disclosed is a method for receiving a downlink signal by a terminal in a wireless communication system from a base station. More particularly, a method for receiving a downlink signal comprises receiving, from a base station, information about a second reference signal being quasi co-located (QCL) and a first reference signal for demodulating a downlink signal; determining the quasi-continuity of the second reference signal on the basis of the average density of the second reference signal, which exists in a window, for determining a quasi-continuity; and receiving the downlink (Continued)

signal from the base station on the basis of the existence of the quasi-continuity of the second reference signal.

10 Claims, 8 Drawing Sheets

(51) Int. Cl.
*H04L 1/00* (2006.01)
*H04L 27/26* (2006.01)
*H04W 16/14* (2009.01)

(56) References Cited

U.S. PATENT DOCUMENTS

| | | | |
|---|---|---|---|
| 2013/0034035 A1* | 2/2013 | Kazmi | H04W 56/0085 370/311 |
| 2013/0343288 A1 | 12/2013 | Ratasuk et al. | |
| 2014/0086574 A1 | 3/2014 | Gariepy et al. | |
| 2015/0049741 A1 | 2/2015 | Chen et al. | |

FOREIGN PATENT DOCUMENTS

| | | |
|---|---|---|
| WO | WO 2013/066203 A1 | 5/2013 |
| WO | WO 2014/062011 A1 | 4/2014 |

\* cited by examiner

(A) CONTROL-PLANE PROTOCOL STACK (B) USER-PLANE PROTOCOL STACK

Case (a)

Case (b)

FIG. 9

METHOD FOR RECEIVING DOWNLINK SIGNAL BY MEANS OF UNLICENSED BAND IN WIRELESS COMMUNICATION SYSTEM AND DEVICE FOR SAME

CROSS REFERENCE TO RELATED APPLICATIONS

This application is the National Phase of PCT/KR2016/003307 filed on Mar. 31, 2016, which claims priority under 35 U.S.C. § 119(e) to U.S. Provisional Application Nos. 62/142,490 filed on Apr. 3, 2015, and 62/238,111 filed on Oct. 6, 2015, all of which are hereby expressly incorporated by reference into the present application.

TECHNICAL FIELD

The present invention relates to a wireless communication system, and more particularly, to a method of receiving a downlink signal through an unlicensed band in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

Figure 1:
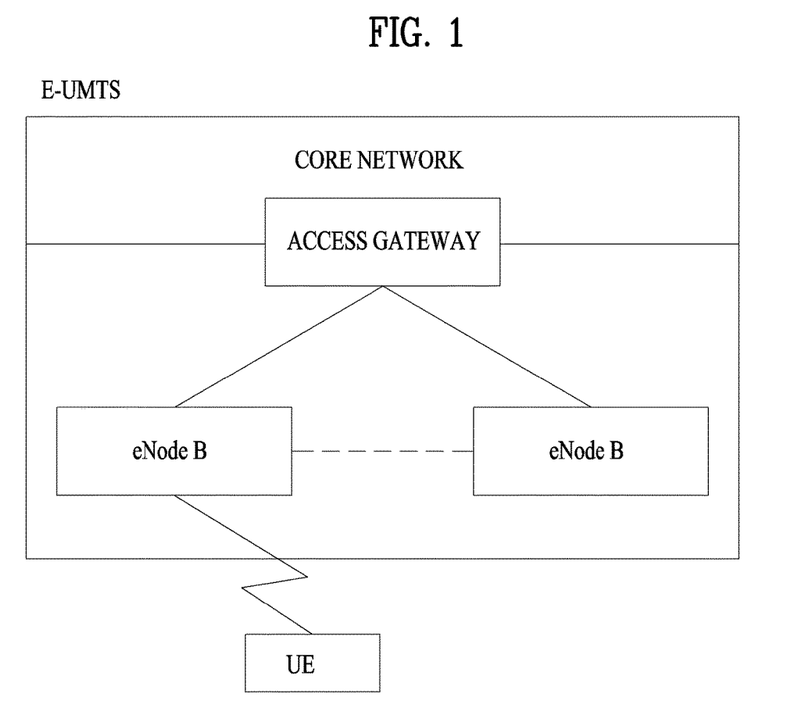
FIG. 1 is a schematic diagram of E-UMTS network structure as one example of a wireless communication system.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

Based on the aforementioned discussion, a method of receiving a downlink signal through an unlicensed band in a wireless communication system and an apparatus therefor are proposed in the following.

Technical Solution

To achieve these and other advantages and in accordance with the purpose of the present invention, as embodied and broadly described, according to one embodiment, a method of receiving a downlink signal, which is received by a user equipment (UE) from an eNB in a wireless communication system, includes receiving information on a second reference signal being QCL (Quasi Co-Location) with a first reference signal for demodulating the downlink signal from the eNB, determining quasi-continuity of the second reference signal according to average density of the second reference signal existing within a window for determining quasi-continuity, and receiving the downlink signal from the eNB based on whether or not the second reference signal is quasi-continuous.

To further achieve these and other advantages and in accordance with the purpose of the present invention, according to a different embodiment, a user equipment in a wireless communication system includes a wireless communication module configured to transceive a signal with an eNB and a processor configured to process the signal, the processor configured to receive information on a second reference signal being QCL (Quasi Co-Location) with a first reference signal for demodulating a downlink signal from the eNB, the processor configured to determine quasi-continuity of the second reference signal according to average density of the second reference signal existing within a window for determining quasi-continuity, the processor configured to control the wireless communication module to receive the downlink signal from the eNB based on whether or not the second reference signal is quasi-continuous.

Preferably, if the average density of the second reference signal existing in the window is equal to or greater than a first threshold value, it is able to determine that the second reference signal has quasi-continuity. More preferably, if the average density of the second reference signal existing in the window is equal to or greater than a first threshold value and a space between the second reference signal existing in the window is equal to or less than a second threshold value, it is able to determine that the second reference signal has quasi-continuity. In this case, the first threshold value can be determined based on at least one of a modulation order of the downlink signal and a target error rate of the downlink signal.

And, the downlink signal can be received through an unlicensed band.

Advantageous Effects

According to the embodiments of the present invention, when discontinuous signal reception such as signal reception received through an unlicensed band is performed, a UE can more efficiently receive a downlink signal in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 2:
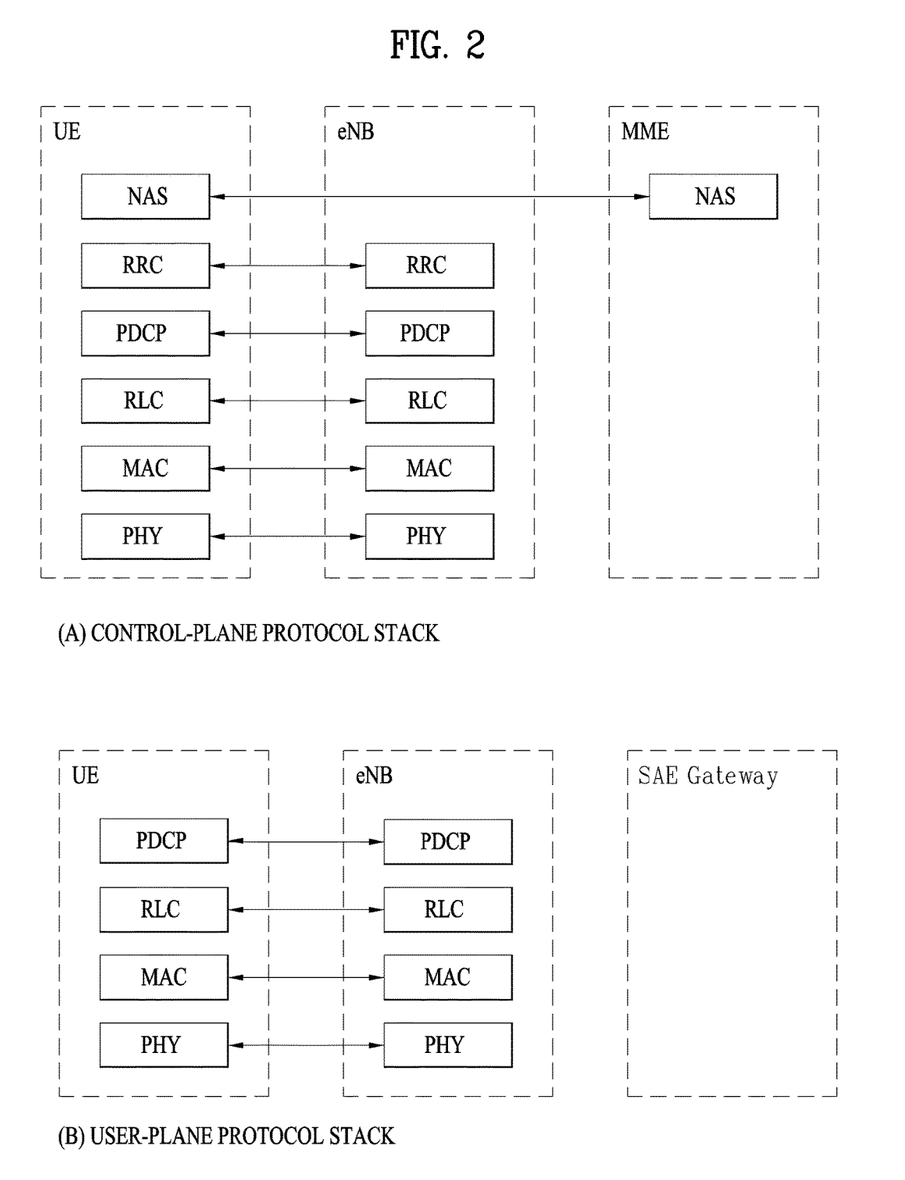
FIG. 2 is a diagram for structures of control and user planes of radio interface protocol between a 3GPP radio access network standard-based user equipment and E-UTRAN.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
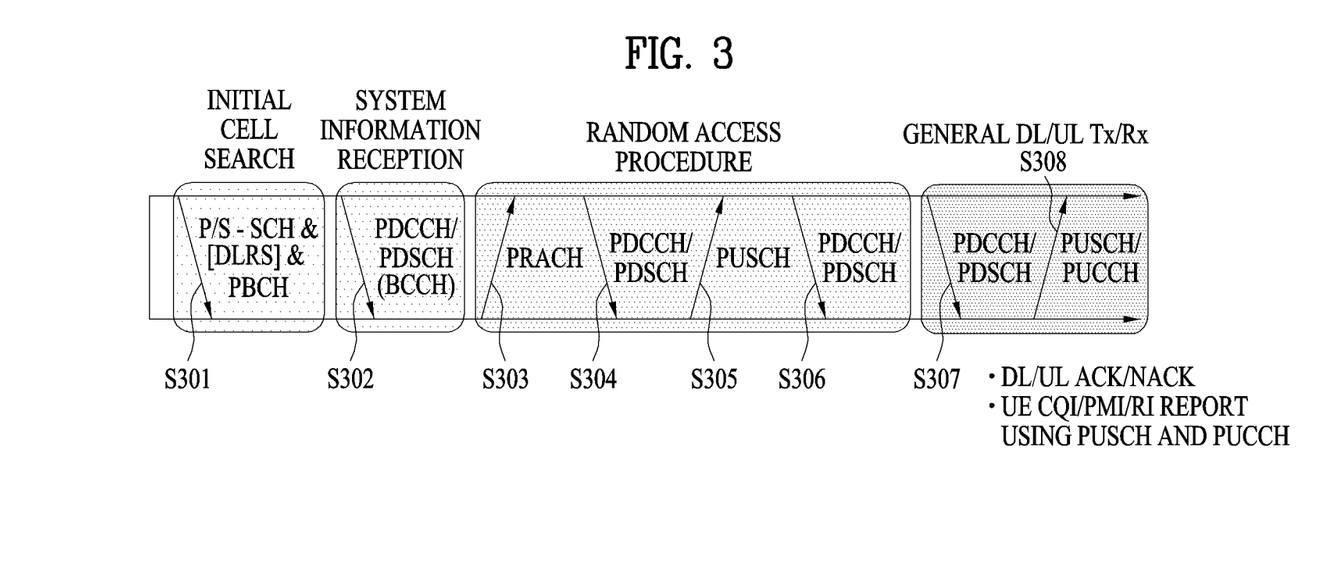
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
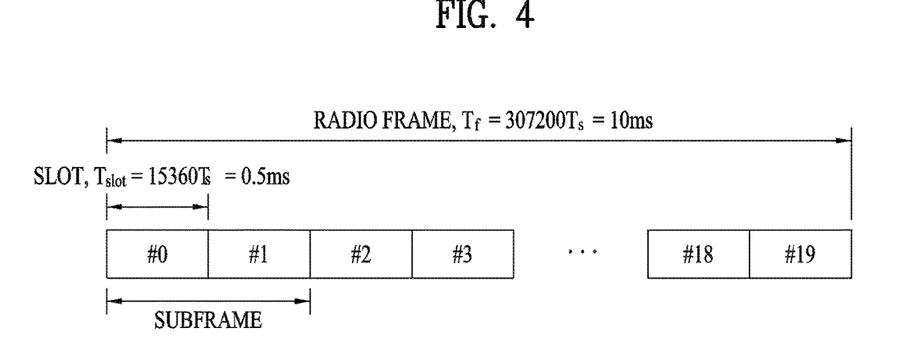
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
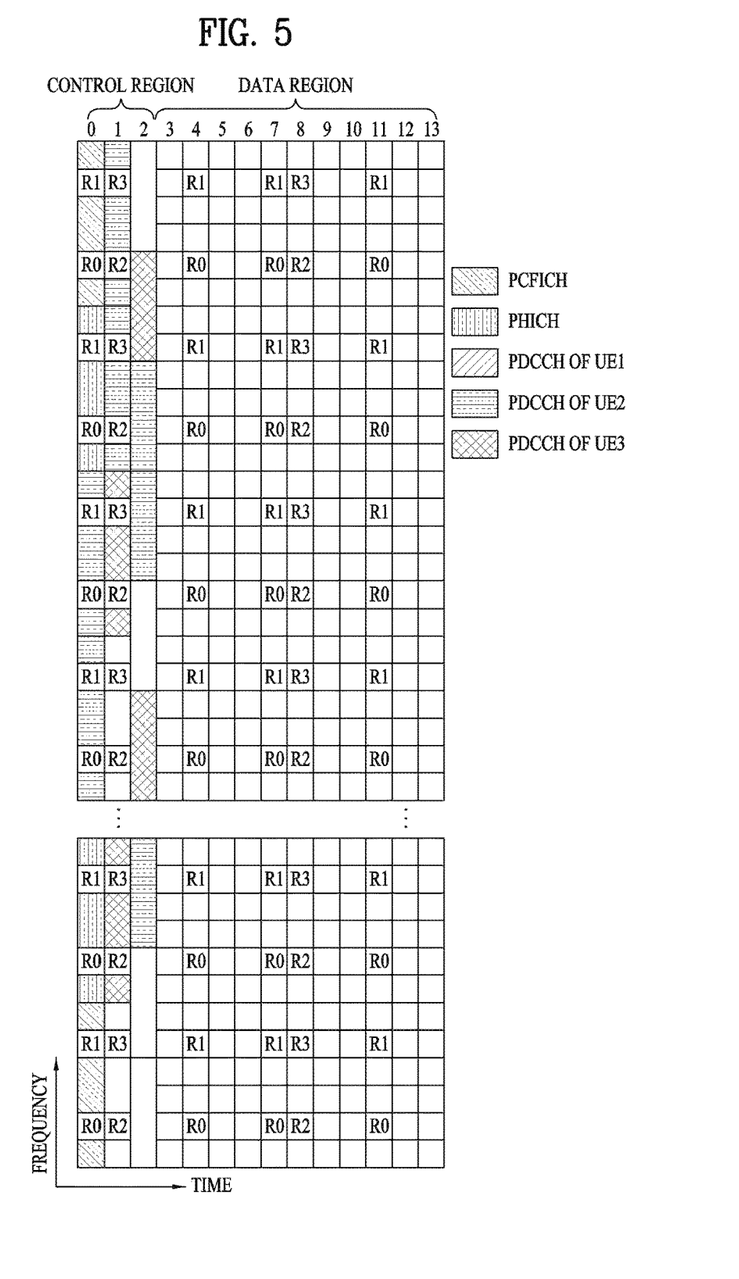
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
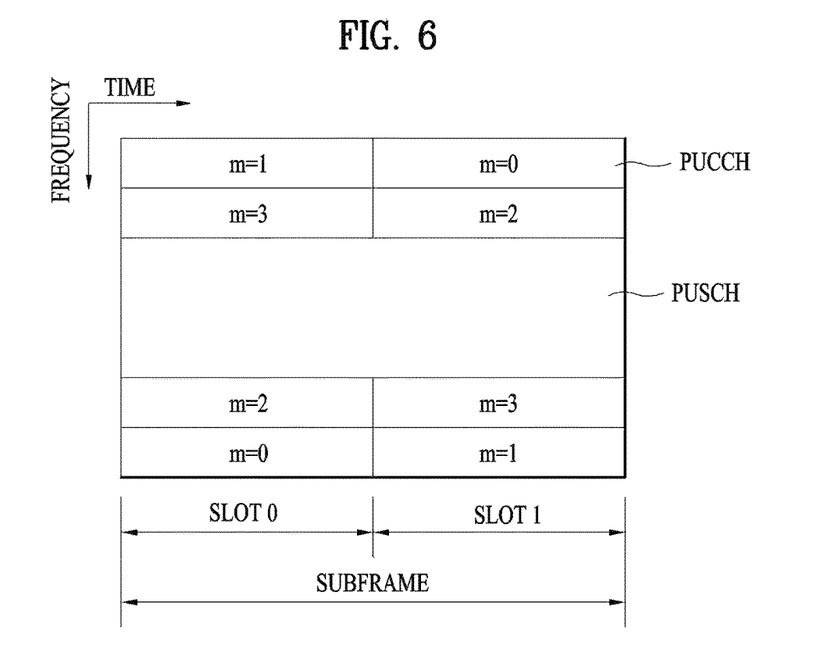
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following, channel state information (CSI) report is explained. Current LTE standard defines two kinds of transmission schemes including an open-loop MIMO which is managed without channel information and a closed-loop MIMO which is managed based on channel information. In order to obtain multiplexing gain of MIMO antennas in the closed-loop MIMO, a base station and a UE respectively perform beamforming based on channel state information (CSI). In order for the base station to obtain the CSI from the UE, the base station transmits a reference signal to the UE and commands the UE to feedback the CSI, which is measured based on the reference signal, via PUCCH (physical uplink control channel) or PUSCH (physical uplink shared channel).

The CSI is mainly classified into 3 kinds of information including RI (rank indicator), PMI (precoding matrix index) and CQI (channel quality indication). The RI indicates rank information of a channel and means the number of signal streams received by a user equipment via an identical frequency-time resource. Since a value of the RI is determined by a long term fading of a channel, the value of the RI is fed back to a base station with an interval longer than a PMI and CQI value in general. The PMI is a value to which a spatial characteristic of a channel is reflected. The PMI indicates a precoding matrix index of a base station preferred by a user equipment on the basis of a metric including a SINR and the like. The CQI is a value indicating strength of a channel and means a reception SINR capable of being obtained when a base station uses the PMI in general.

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

In LTE, it is regulated that when a DL signal is transmitted in Mode 10 being a CoMP transmission mode, an eNB configures one of QCL type A and QCL type B for a UE via a higher layer signaling.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

Meanwhile, as more communication devices are requiring greater communication capacity, a next generation wireless communication system is trying to find ways to efficiently utilizing a limited frequency band. In particular, the next generation wireless communication system such as LTE system considers utilizing such an unlicensed band as 2.4 GHz band mainly used by a legacy WiFi system and newly spotlighting 5 GHz band for traffic offloading. Since an unlicensed band basically assumes that wireless transmission and reception are performed via contention between communication nodes, it is required for each communication node to perform channel sensing (CS) before a signal is transmitted to check a signal is not transmitted by a different communication node. For clarity, the above mentioned operation is referred to as LBT (listen before talk). In particular, if it is determined as a different communication node transmits no signal, it is defined as CCA (clear channel assessment) is checked.

In LTE system, an eNB and a UE should perform LBT to transmit a signal on an unlicensed band (hereinafter, LTE-U band or U-band). When the eNB or the UE transmits a signal, other communication nodes such as Wi-Fi and the like should perform LBT not to cause interference. For example, according to WiFi standard (802.11ac), a CCA threshold is regulated by −62 dBm for a non-WiFi signal and is regulated by −82 dBm for a WiFi signal. For example, if a signal other than a WiFi signal is received by power equal to or greater than −62 dBm, an STA or an AP does not perform signal transmission in order not to cause any interference.

As mentioned in the foregoing description, it may be difficult to always guarantee downlink transmission of an eNB or uplink transmission of a UE on U-band, an LTE UE operating on the U-band may maintain access with a different cell operating on a licensed band (hereinafter, L-band) to stably control mobility, RRM (radio resource management) function, and the like. In the present invention, a cell accessed by a UE on the U-band is referred to as an UScell and a cell accessed by the UE on the L-band is referred to as a Pcell. A scheme of performing data transmission/reception on the U-band using a combination with the L-band is called LAA (licensed assisted access).

If transmission is intermittently performed only when transmission accompanied with LBT is performed on the U-band or a wireless node requires data transmission for other reason, it may influence on PDSCH/PDCCH (EPDCCH) reception capability of a UE. More specifically, in order for the UE to receive a specific downlink channel, it is necessary for the UE to perform a reception preparation work through an RS being QCL with an antenna port of the channel. More specifically, in order for the UE to receive a specific downlink channel, it is necessary for the UE to perform a reception preparation work through an RS being QCL with an antenna port of the downlink channel. The reception preparation work can include an operation of configuring a coefficient of a filter used for estimating a channel based on power-delay-profile, delay spread and Doppler spectrum, and Doppler spread estimation result, synchronization and tracking based on a result of estimating an error in time and frequency domain, an operation of configuring AGC (automatic gain control) based on a result of estimating average received power, and the like. Hence, although a channel is idle at specific timing and an eNB is able to transmit a downlink channel, if it fails to sufficiently transmit an RS being QCL with an antenna port of the channel, it may be difficult for a UE to properly receive the downlink channel. This is because, although a CRS or a CSI-RS, which is utilized as a reference for QCL of each downlink channel, is continuously transmitted on a legacy licensed band, continuous transmission of an RS, which becomes a reference of QCL, is not guaranteed in a situation that intermittent transmission is unavoidable such as the U-band accompanied with LBT.

Yet, since the RS corresponding to the reference for QCL is generally designed to be transmitted with density higher than density necessary for achieving the purpose of simply obtaining a large scale property, the RS is designed to be transmitted with the higher density for a more stable operation and a different purpose rather than the purpose of the QCL reference. Hence, when a UE is actually implemented, it is not necessary to utilize all RSs becoming a reference for QCL for the reception preparation work. In particular, although transmission of the RS corresponding to the reference for QCL is terminated at partial timing, if the RS is sufficiently transmitted at different timing, there is no problem for the UE to perform the preparation work through the QCL.

In particular, when an eNB performs transmission intermittently, the present invention proposes to configure a reference capable of assuming that an RS becoming a reference for QCL of a downlink channel is continuously transmitted. And, the present invention proposes an operation in the following. If the reference capable of assuming that the RS is continuously transmitted is satisfied, it is necessary for a UE to maintain high performance (e.g., high throughput or low error rate). On the contrary, if the reference capable of assuming that the RS is continuously transmitted is not satisfied, it may allow the UE to have lower performance.

In the following, if an RS corresponding to a reference for QCL is sufficiently transmitted and a situation of maintaining high performance by a UE is satisfied, it is defined as a reference for quasi-continuity of the RS is achieved or the RS is quasi-continuously transmitted. Since an eNB knows how an RS is transmitted by the eNB in the past, if an RS is not quasi-continuously transmitted at specific timing, it may be preferable for the eNB not to transmit a downlink channel being QCL with the RS. Or, it may be able to transmit the downlink channel with a target of low performance, e.g., using a lower MCS (modulation and coding scheme) level.

First of all, a reference for quasi-continuity of an RS is explained in detail.

Basically, it is necessary to transmit an RS with sufficient density for quasi-continuous transmission. For example, when an RS is transmitted more than X times during x ms on the basis of a subframe #n in which a downlink channel being QCL is transmitted (i.e., within a time window ranging from a subframe #(n-x) to a subframe #(n-1)), it may be able to consider it as a reference for the quasi-continuity is satisfied.

Figure 7:
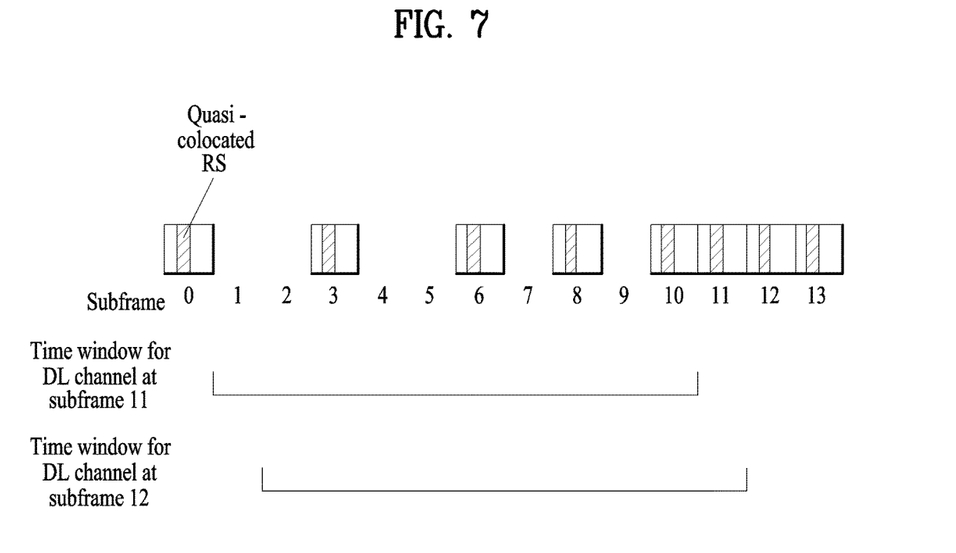
FIG. 7 is a diagram for an example of a quasi-continuity reference according to embodiment of the present invention.

FIG. 7 is a diagram for an example of a quasi-continuity reference according to an embodiment of the present invention. In particular, in FIG. 7, if an RS capable of being transmitted one time in 1 ms is transmitted more than 50% in a time window of 10 ms, it is assumed as a condition of quasi-continuity is satisfied.

Referring to FIG. 7, since a downlink channel transmitted in a subframe #11 has a time window ranging from a subframe #1 and a subframe #10 and an RS is transmitted 4 times in the time window, a UE considers that the RS is not quasi-continuously transmitted. On the contrary, since a downlink channel transmitted in a subframe #12 has a time window ranging from a subframe #2 and a subframe #11 and an RS is transmitted 5 times in the time window, a UE considers that the RS is quasi-continuously transmitted.

As a special case of the present invention, when a length x of a time window is identical to the number X of transmission of an RS necessary for the quasi-continuity, if an eNB performs transmission in continuous subframes, since the quasi-continuity is automatically not satisfied in the first x number of subframes, it may allow a UE to perform reception with low performance. On the contrary, it may be able to regulate the UE to perform reception with high performance in the subframes appearing thereafter. For example, if x is set to 1, it may indicate that reception of low performance is permitted in a first subframe only when an eNB transmits continuous subframes.

However, as mentioned in the foregoing description, if there is a quasi-continuous reference for average density only, although RS transmission is concentrated on specific timing, i.e., the fore part of a time window, the quasi-continuous reference is satisfied. However, since this is far from the continuous transmission, a UE is unable to properly induce a large scale property. Although the UE induces a large scale property, the large scale property may considerably change at the timing at which a downlink channel is received.

Hence, it may be able to add an additional condition to the distribution of RSs in a time window. For example, it may add a condition that a maximum value of a distance between a downlink channel and each RS transmission and/or a maximum value of a distance between RS transmissions is equal to or less than a prescribed level. As a different example, it may add a condition that the time window is divided into sub windows and RS transmission should be performed at least several times in each of the sub windows.

Figure 8:
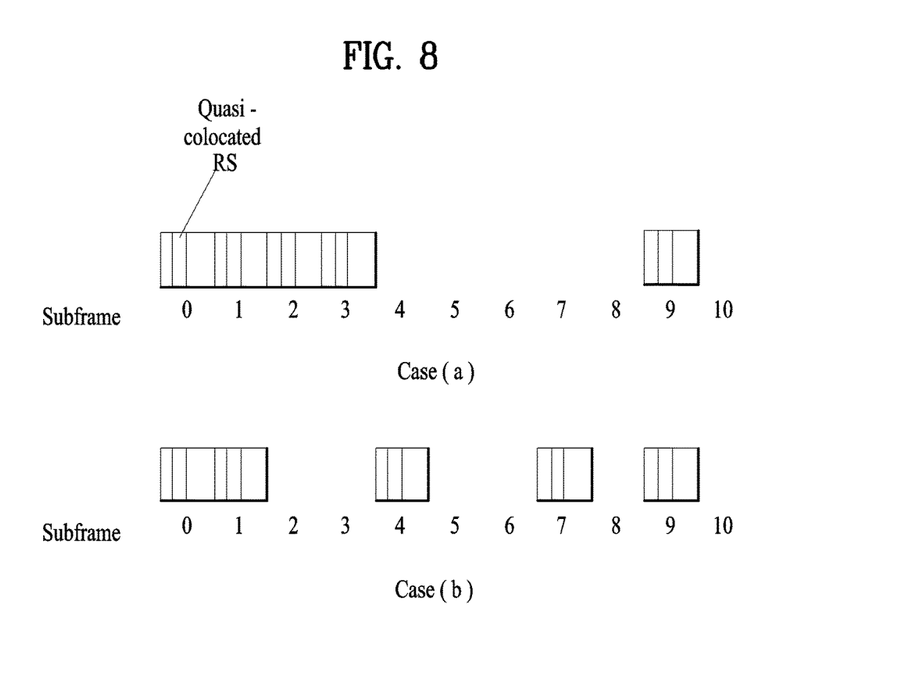
FIG. 8 is a diagram for a different example of a quasi-continuity reference according to embodiment of the present invention.

FIG. 8 is a diagram for a different example of a quasi-continuity reference according to embodiment of the present invention.

Referring to FIG. 8, it is able to know that RS transmission is performed 5 times in a time window of 10 ms for both a case (a) and a case (b). In this case, if a condition that a maximum interval value between RSs is equal to or less than 3 ms is added, it is able to consider that an RS is quasi-continuously transmitted in the case (b) only.

Meanwhile, although the same RS is used, a quasi-continuity reference may vary according to a type of a downlink channel becoming a target of QCL and/or a modulation scheme used by a downlink channel. In general, in case of a high modulation order that applies more coded bits in a single modulation symbol, it may be able to perform stable reception only when more delicate channel estimation is performed. This indicates that it is necessary to more delicately estimate a large scale property as well.

In particular, a quasi-continuity reference for a downlink channel of a low modulation order such as QPSK may be different from a quasi-continuity reference for a downlink channel of a high modulation order such as 64QAM or 256QAM. In general, it is able to configure a reference for a high modulation order to require more RS transmissions. In particular, if a reference for a high modulation order is satisfied, a reference for a low modulation order can be automatically satisfied. An eNB can control a modulation order of a downlink channel by reflecting the abovementioned situation.

For example, when PDSCH is transmitted in a subframe #n, if quasi-continuity for QPSK is satisfied, whereas quasi-continuity for 16 QAM is not satisfied, an eNB transmits the PDSCH using QPSK in the subframe #n. In this case, if a quasi-continuity reference for 16 QAM is satisfied in a subframe #(n+1) due to an RS transmitted in the subframe #n, the PDSCH is transmitted using 16 QAM in the subframe #(n+1). Although a control channel and a data channel use the same modulation order, since a target error rate is different, the control channel and the data channel may have a different quasi-continuity condition.

In the following, a specific form of an RS becoming a reference for QCL is explained.

A) A CRS (or an RS of a different name mapped to the same RE) of a legacy LTE system may become the RS. This has a merit in that it is able to reuse a QC relation between a legacy CRS and a different antenna port. It is necessary for a UE to identify whether or not a CRS is actually transmitted at every timing capable of transmitting the CRS. This can be done by directly performing blind detection on whether or not a CRS exists or by performing blind detection on a different signal rather than the CRS (e.g., a permeable indicating the start of transmission of an eNB) and detecting a relation between the signal and the CRS. Whether or not a CRS is actually transmitted at every CRS transmission timing can be identified in a manner that an eNB signals whether or not the CRS is transmitted. In this case, the signaling may correspond to direct signaling for the existence of an RS or indirect signaling for scheduling a downlink channel. Of course, a combination thereof is also available. In particular, whether or not a CRS exists can be identified by directly performing blind detection in a partial CRS section. Meanwhile, whether or not a CRS exists can be identified using signaling of an eNB in a different partial section. In particular, the combination operation can be applied to a case that a UE performs blind detection on a cell detection RS.

B) A CSI-RS of a legacy LTE system may correspond to an RS becoming a reference for QCL. In particular, similar to CoMP operation, when a TP (transmission point) configured to transmit a downlink channel is changed, the CSI-RS may become a QCL reference of a downlink channel. In general, since a CSI-RS is transmitted with a period longer than a period of a CRS, similar to the legacy LTE, a partial large scale property is QCL with the CRS and another partial large scale property is QCL with the CSI-RS. Hence, a quasi-continuity condition can be differently defined as well.

In this case, in the aspect of a specific downlink channel of specific timing, a quasi-continuity condition of a CRS is satisfied, whereas a quasi-continuity condition of a specific CSI-RS is not satisfied. For example, a serving cell of a UE can transmit a CRS because a channel is idle. On the contrary, a neighbor cell participating in CoMP may fail to transmit a CSI-RS of the neighbor cell because a channel is busy. In this case, it can be considered that the UE fails to satisfy overall quasi-continuity reference for PDSCH being QCL with the CSI-RS.

In particular, when a specific downlink channel is QCL with two or more RSs, it may be able to smoothly demodulate the channel only when all RSs satisfy the quasi-continuity reference. However, since an attribute of the CRS is different from an attribute of the CSI-RS and a parameter to which QCL is applied is different, a transmission period and density are different between the CRS and the CSI-RS. Hence, it may be able to define a different quasi-continuity reference. Of course, in the aforementioned case, a further different CSI-RS (e.g., a CSI-RS of a serving cell) may satisfy the quasi-continuity reference. In this case, a network can transmit a downlink channel using a combination that satisfies a reference for both the CRS and the CSI-RS.

C) In a legacy LTE system, if a cell has no traffic, the cell can maintain an off state. Yet, when UEs transmit a DRS (discovery RS) to discover the cell, the DRS can be used as an RS becoming a reference for QCL. The DRS can include a PSSS/SSS for synchronization, a CRS, or a CSI-RS. In order to efficiently transmit a plurality of RSs, the DRS can be configured by a form occupying a plurality of OFDM symbols and a plurality of subframes. Since it is able to transmit an RS corresponding to a QCL reference of a downlink channel as a part of the DRS, if a UE detects the DRS, the UE is able to identify the timing at which an RS is transmitted and whether or not the identified RS satisfies each quasi-continuity reference according to a configuration of the DRS. In this case, an eNB can transmit a CRS or a CSI-RS in a section in which the DRS is not transmitted to transmit data. In this case, a quasi-continuity reference can be determined using methods described in the following.

Method 1: An RS, which is transmitted in a section rather than a section in which a DRS is transmitted, is also applied to a quasi-continuity condition. Whether or not an eNB transmits an RS in a section rather than the section in which the DRS is transmitted can be indirectly identified through a blind detection result of a different signal. Or, the eNB can signal a section in which the RS is transmitted. If the eNB schedules a downlink signal to be received in a subframe, a UE can identify that an RS is transmitted in the subframe according to an RS configuration. Of course, the UE may select one from among the abovementioned methods or use a plurality of the methods together. As mentioned in the foregoing description, a method for the UE to determine whether or not the RS is transmitted can be performed by a combination of a plurality of the methods according to a selected method.

Method 2: An RS, which is transmitted in a section rather than a section in which a DRS is transmitted, is not applied to a quasi-continuity condition. According to the method 2, since a UE performs blind detection on a DRS only, this method has a merit in that it may be able to reduce power consumption of the UE and implementation of the UE is not complicate. In particular, since the UE is unable to identify whether or not an RS is transmitted in a section rather than the section in which the DRS is transmitted, the UE can more stably determine whether or not a quasi-continuity condition is satisfied using the information on whether or not the DRS is transmitted only.

Method 3: An RS, which is transmitted in a section in which a DRS is transmitted, is not applied to a quasi-continuity condition. By doing so, when a UE attempts to detect DRS transmission and RS transmission, respectively, it may be able to make an error in detecting a DRS not to cause any misinterpretation of RS-based quasi-continuity. In particular, transmission timing at which a DRS is transmitted only (e.g., since an RS sequence is different from a normal case, a DRS is not utilized for demodulating a different channel) can be optionally excluded from a quasi-continuity condition.

D) A preamble, which is transmitted to identify a start point of intermittent transmission of an eNB, can be used as an RS becoming a reference of QCL. If a UE identifies the preamble, the UE is able to identify that transmission of the eNB has been started. And, the UE can obtain a large scale property using the preamble. In this case, a partial large scale property can be QCL with the preamble. Specifically, it can be regarded as a large scale property, which is QCL with a CRS in a specific configuration of a specific transmission mode, is QCL with the preamble. As a different meaning, it can be considered as the preamble is QCL with the CRS. In case of performing CoMP, a cell belonging to a CoMP set transmits a common preamble, obtains a large scale property, which is previously obtained via a CRS, using the common preamble, and maintains a CSI-RS transmitted by each cell according to a cell to obtain the remaining parameter. Or, a different cell transmits a preamble of the cell and a UE attempts to detect preambles of all cells participating in CoMP to obtain a large scale property via QCL.

A UE can perform operations described in the following as embodiments of the aforementioned methods.

The UE can assume that the UE is able to receive a DRS, a PSS/SSS, or CRSs equal to or greater than the number of specific OFDM symbols (e.g., 4 OFDM symbols for a CRS antenna port #0) or the number of specific antennas (e.g., 2 CRS antenna ports) via at least one or more subframes appearing prior to a subframe in which PDSCH or a different signal is received or X ms including the subframe. Or, the UE can assume that an eNB can transmit the CRSs. If the abovementioned condition is not satisfied, a requirement for reception performance of the UE is lowered or it is not necessary to satisfy the requirement for the reception performance of the UE.

The UE can assume that time synchronization obtained from a DRS or a PSS/SSS, which is lastly received by the UE (or lastly transmitted by the eNB), is maintained within a prescribed level for a subframe in which PDSCH or a different signal is received. Or, if the UE is unable to receive a DRS or a PSS/SSS during a specific time period, a requirement for reception performance of the UE is lowered or it is not necessary to satisfy the requirement for the reception performance of the UE.

In the abovementioned embodiments, a section in which reception is turned off due to a DRX operation of a UE, i.e., a frequency section in which reception is terminated due to inter-frequency measurement, and the like, can be excluded from a reference section in which an RS for synchronization such as a DRS, a PSS/SSS, a CRS is received.

Figure 9:
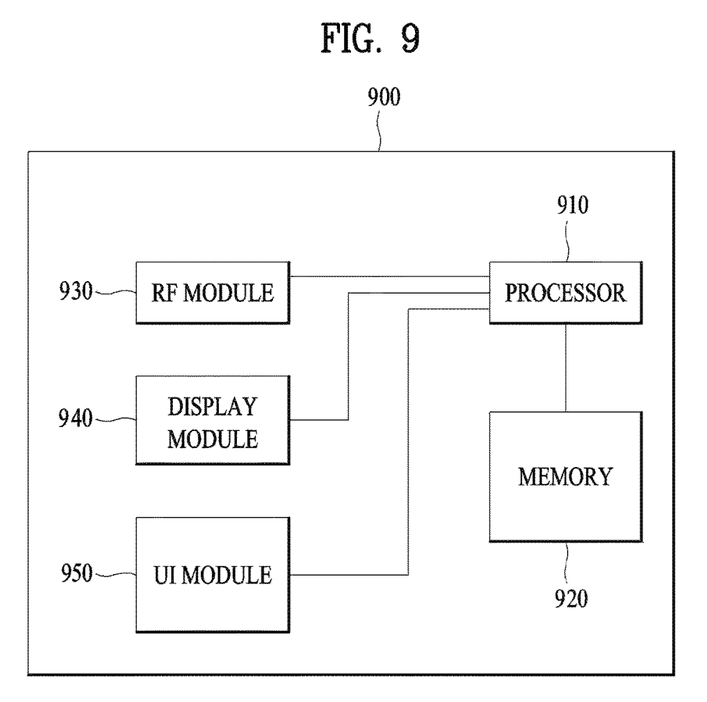
FIG. 9 is a block diagram for a communication device according to one embodiment of the present invention.

FIG. 9 is a block diagram for an example of a communication device according to one embodiment of the present invention.

Referring to FIG. 9, a communication device 900 may include a processor 910, a memory 920, an RF module 930, a display module 940, and a user interface module 950.

Since the communication device 900 is depicted for clarity of description, prescribed module(s) may be omitted in part. The communication device 900 may further include necessary module(s). And, a prescribed module of the communication device 900 may be divided into subdivided modules. A processor 910 is configured to perform an operation according to the embodiments of the present invention illustrated with reference to drawings. In particular, the detailed operation of the processor 910 may refer to the former contents described with reference to FIG. 1 to FIG. 8.

The memory 920 is connected with the processor 910 and stores an operating system, applications, program codes, data, and the like. The RF module 930 is connected with the processor 910 and then performs a function of converting a baseband signal to a radio signal or a function of converting a radio signal to a baseband signal. To this end, the RF module 930 performs an analog conversion, amplification, a filtering, and a frequency up conversion, or performs processes inverse to the former processes. The display module 940 is connected with the processor 910 and displays various kinds of informations. And, the display module 940 can be implemented using such a well-known component as an LCD (liquid crystal display), an LED (light emitting diode), an OLED (organic light emitting diode) display and the like, by which the present invention may be non-limited. The user interface module 950 is connected with the processor 910 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of receiving a downlink signal trough an unlicensed band in a wireless communication system and an apparatus therefor are described with reference to examples applied to 3GPP LTE system, it may be applicable to various kinds of wireless communication systems as well as the 3GPP LTE system.

What is claimed is:

1. A method of receiving a downlink signal by a user equipment (UE) from an eNB in a wireless communication system, the method comprising:
    receiving information on a second reference signal being QCL (Quasi Co-Location) with a first reference signal for demodulating the downlink signal from the eNB;
    determining quasi-continuity of the second reference signal according to average density of the second reference signal existing within a window for determining quasi-continuity; and
    receiving the downlink signal from the eNB based on whether or not the second reference signal is quasi-continuous.

2. The method of claim 1, wherein if the average density of the second reference signal existing in the window is equal to or greater than a first threshold value, determining the quasi-continuity of the second reference signal comprises determining that the second reference signal has quasi-continuity.

3. The method of claim 1, wherein if the average density of the second reference signal existing in the window is equal to or greater than a first threshold value and a space between the second reference signal existing in the window is equal to or less than a second threshold value, determining the quasi-continuity of the second reference signal comprises determining that the second reference signal has quasi-continuity.

4. The method of claim 2, wherein the first threshold value is determined based on at least one of a modulation order of the downlink signal and a target error rate of the downlink signal.

5. The method of claim 1, wherein receiving the downlink signal comprises receiving the downlink signal through an unlicensed band.

6. A user equipment in a wireless communication system, the user equipment comprising:
    a wireless communication module configured to transceive a signal with an eNB; and
    a processor configured to process the signal,
    wherein the processor is configured to receive information on a second reference signal being QCL (Quasi Co-Location) with a first reference signal for demodulating a downlink signal from the eNB, to determine quasi-continuity of the second reference signal according to average density of the second reference signal existing within a window for determining quasi-continuity, and to control the wireless communication module to receive the downlink signal from the eNB based on whether or not the second reference signal is quasi-continuous.

7. The user equipment of claim 6, wherein if the average density of the second reference signal existing in the window is equal to or greater than a first threshold value, the processor is configured to determine that the second reference signal has quasi-continuity.

8. The user equipment of claim 6, wherein if the average density of the second reference signal existing in the window is equal to or greater than a first threshold value and a space between the second reference signal existing in the window is equal to or less than a second threshold value, the processor is configured to determine that the second reference signal has quasi-continuity.

9. The user equipment of claim 7, wherein the first threshold value is determined based on at least one of a modulation order of the downlink signal and a target error rate of the downlink signal.

10. The user equipment of claim 6, wherein the downlink signal is received through an unlicensed band.

* * * * *